United States Patent
Brown et al.

(10) Patent No.: US 7,594,120 B2
(45) Date of Patent: Sep. 22, 2009

(54) USER-DEFINED PASSWORDS HAVING ASSOCIATED UNIQUE VERSION DATA TO ASSIST USER RECALL OF THE PASSWORD

(75) Inventors: Michael K. Brown, Ontario (CA); Herbert A. Little, Ontario (CA); Michael G. Kirkup, Ontario (CA)

(73) Assignee: Research In Motion Limited, Waterloo, Ontario (CA)

( * ) Notice: Subject to any disclaimer, the term of this patent is extended or adjusted under 35 U.S.C. 154(b) by 887 days.

(21) Appl. No.: 10/927,501

(22) Filed: Aug. 27, 2004

(65) Prior Publication Data

US 2006/0048215 A1   Mar. 2, 2006

(51) Int. Cl.
*G06F 21/00* (2006.01)
*G06F 7/04* (2006.01)
*G06F 15/16* (2006.01)
*G06F 17/30* (2006.01)
*H04L 9/32* (2006.01)
*G06F 7/00* (2006.01)

(52) U.S. Cl. .................. 713/183; 713/184; 713/185; 726/4; 726/5; 726/7; 726/8; 726/28; 726/29; 726/30; 707/1

(58) Field of Classification Search .............. 713/183, 713/184
See application file for complete search history.

(56) References Cited

U.S. PATENT DOCUMENTS

| | | | | |
|---|---|---|---|---|
| 5,345,549 A | * | 9/1994 | Appel et al. | 715/741 |
| 5,425,102 A | * | 6/1995 | Moy | 713/183 |
| 6,370,649 B1 | | 4/2002 | Angelo et al. | |
| 6,799,286 B1 | * | 9/2004 | Evans et al. | 714/57 |
| 2005/0038766 A1 | * | 2/2005 | Bantz et al. | 707/1 |
| 2005/0071686 A1 | * | 3/2005 | Bagga et al. | 713/202 |
| 2005/0114679 A1 | * | 5/2005 | Bagga et al. | 713/184 |
| 2006/0059442 A1 | * | 3/2006 | Bornstein et al. | 715/854 |
| 2006/0143450 A1 | * | 6/2006 | Airody Udupa et al. | 713/168 |
| 2006/0271789 A1 | * | 11/2006 | Satomura et al. | 713/183 |

FOREIGN PATENT DOCUMENTS

WO    WO 01/44916 A2    6/2001

OTHER PUBLICATIONS

European Search Report, Jul. 17, 2005.

* cited by examiner

*Primary Examiner*—Shin-Hon Chen
(74) *Attorney, Agent, or Firm*—Ridout & Maybee LLP

(57) ABSTRACT

An electronic device includes password protected functionality using a password that can be changed by the user. A user-specified password is stored in association with unique version data that is subsequently provided to help user recall of the password associated therewith.

24 Claims, 7 Drawing Sheets

USER-DEFINED PASSWORDS HAVING ASSOCIATED UNIQUE VERSION DATA TO ASSIST USER RECALL OF THE PASSWORD

BACKGROUND

1. Technical Field

This invention relates to apparatus, method and stored computer program media effecting password-protected functionality.

2. Description of Related Art

Modern electronic devices often have password-protected functionality. In many cases, the currently effective password may be user-defined. However, this may present a severe difficulty or at least nuisance if the user cannot later recall the correct password.

The problem may be even more severe with devices having a user's private keys encrypted with a Key Store password coupled with an ability to back up and restore encrypted copies of those private cryptographic keys. This is especially problematic where the user may change the password from time-to-time and then, after having restored from backup some older private cryptographic key set, not being able to recall which password is correctly associated with that particular set of restored cryptographic keys. Furthermore, there is at least a potential problem in causing the device to use the correct one of several possible prior passwords during user attempts to decrypt restored keys.

SUMMARY

We solve such problems by automatically defining unique password "version" data with a user-defined password. For example, an integer may be stored with the encrypted copy of some data (e.g., private cryptographic keys) to help the user identify which password was used to protect that particular data.

In order to make the system user friendly, one possibility is to simply use the date/time that a particular password was first defined by the user as the password version data. A counter may be incremented and/or decremented to provide unique version data as well. However, when the date/time data (e.g., the continuously increasing chronological date and/or time of day) is used, this helps provide a better clue to jog the user's memory. In particular, it provides a clue to the user without revealing any useful information about the password to an attacker. Providing a clue defined by the user or otherwise (e.g., "your password begins with a "m" and ends with "wave",") might be helpful to the user but also may aid an attacker in determining the password.

In particular, instead of merely asking some generic question (e.g., "This key was protected with an older password. Please enter it to decrypt the key."), the exemplary embodiment of this invention may instead ask a more pertinent and useful question without revealing any useful information to an attacker (e.g., "This key was protected with a password from Jun. 1, 2004. Please enter it to decrypt the key.").

This invention may be embodied in hardware, software or a combination of hardware and software. The invention also provides a method for giving improved password control by storing a user-specified password in association with unique version data that is subsequently provided to help user recall of the password associated therewith.

BRIEF DESCRIPTION OF THE DRAWINGS

These and other objects and advantages of this invention will be more completely understood and appreciated by careful study of the following more detailed description of at least one exemplary embodiment in conjunction with the accompanying drawings, in which.

DETAILED DESCRIPTION OF EXEMPLARY EMBODIMENTS

Figure 1:
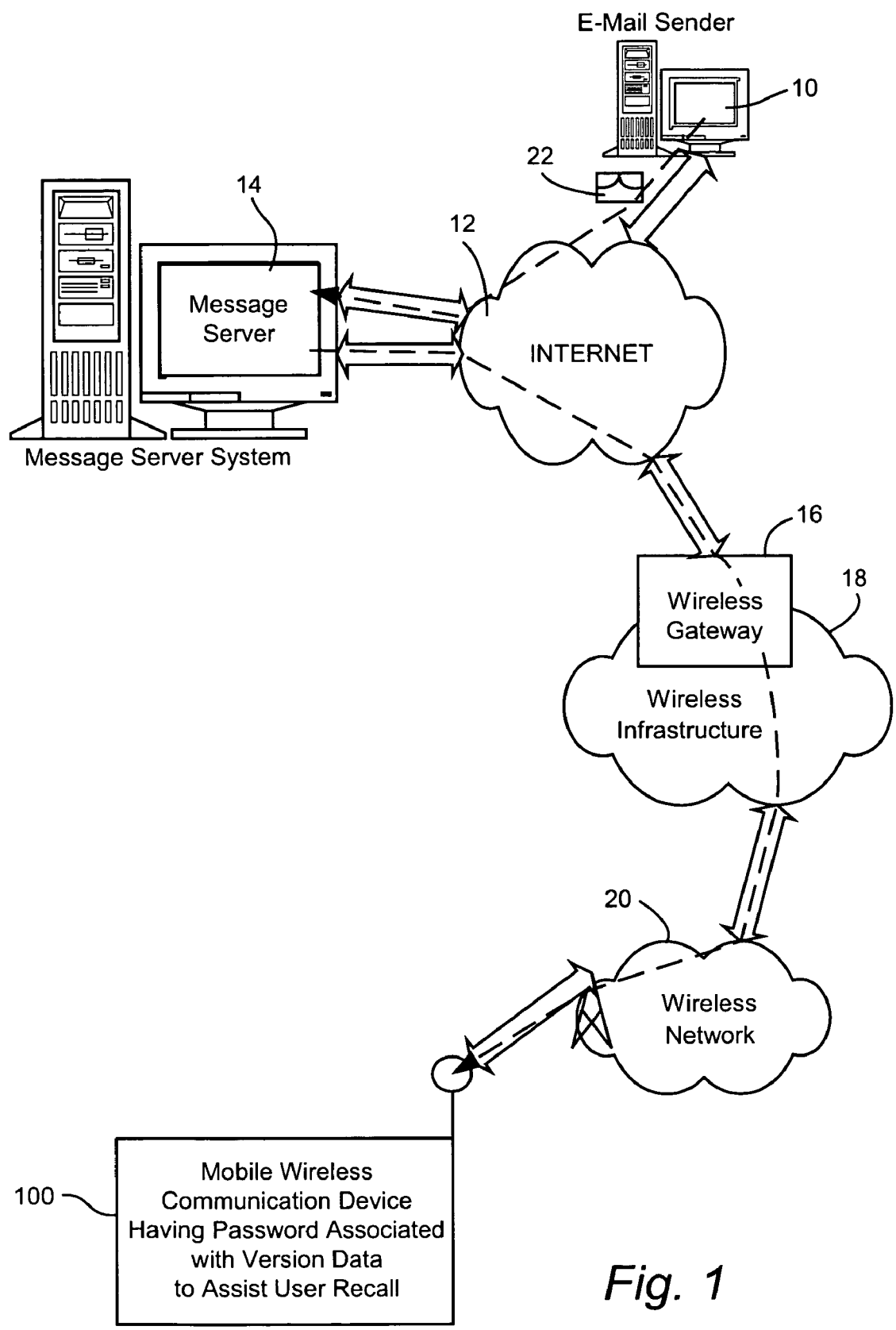
FIG. 1 is an overall system wide schematic view of an exemplary wireless email communication system incorporating a mobile wireless communication device having passwords associated with version data to assist user recall in accordance with one exemplary embodiment of this invention.

FIG. 1 is an overview of an exemplary communication system in which a wireless communication device 100 may be used in accordance with this invention. One skilled in the art will appreciate that there may be hundreds of different system topologies. There may also be many message senders and recipients. The simple exemplary system shown in FIG. 1 is for illustrative purposes only, and shows perhaps the currently most prevalent Internet e-mail environment.

FIG. 1 shows an e-mail sender 10, the Internet 12, a message server system 14, a wireless gateway 16, wireless infrastructure 18, a wireless network 20 and a mobile communication device 100.

An e-mail sender 10 may, for example, be connected to an ISP (Internet Service Provider) on which a user of the system has an account, located within a company, possibly connected to a local area network (LAN), and connected to the Internet 12, or connected to the Internet 12 through a large ASP (application service provider) such as American Online™ (AOL). Those skilled in the art will appreciate that the systems shown in FIG. 1 may instead be connected to a wide area network (WAN) other than the Internet, although e-mail transfers are commonly accomplished through Internet-connected arrangements as shown in FIG. 1.

The message server 14 may be implemented, for example, on a network computer within the firewall of a corporation, a computer within an ISP or ASP system or the like, and acts as the main interface for e-mail exchange over the Internet 12. Although other messaging systems might not require a message server system 14, a mobile device 100 configured for receiving and possibly sending e-mail will normally be associated with an account on a message server. Perhaps the two most common message servers are Microsoft Exchange™ and Lotus Domino™. These products are often used in conjunction with Internet mail routers that route and deliver mail. These intermediate components are not shown in FIG. 1, as they do not directly play a role in the invention described below. Message servers such as server 14 typically extend beyond just e-mail sending and receiving; they also include dynamic database storage engines that have predefined database formats for data like calendars, to-do lists, task lists, e-mail and documentation.

The wireless gateway 16 and infrastructure 18 provide a link between the Internet 12 and wireless network 20. The wireless infrastructure 18 determines the most likely network for locating a given user and tracks the users as they roam between countries or networks. A message is then delivered to the mobile device 100 via wireless transmission, typically at a radio frequency (RF), from a base station in the wireless network 20 to the mobile device 100. The particular network 20 may be virtually any wireless network over which messages may be exchanged with a mobile communication device.

As shown in FIG. 1, a composed e-mail message 22 is sent by the e-mail sender 10, located somewhere on the Internet 12. This message 22 typically uses traditional Simple Mail Transfer Protocol (SMTP), RFC 822 headers and multipurpose Internet Mail Extension (MIME) body parts to define the format of the mail message. These techniques are all well known to those skilled in the art. The message 22 arrives at the message server 14 and is normally stored in a message store. Most known messaging systems support a so-called "pull" message access scheme, wherein the mobile device 100 must request that stored messages be forwarded by the message server to the mobile device 100. Some systems provide for automatic routing of such messages which are addressed using a specific e-mail address associated with the mobile device 100. In a preferred embodiment, messages addressed to a message server account associated with a host system such as a home computer or office computer which belongs to the user of a mobile device 100 are redirected from the message server 14 to the mobile device 100 as they are received.

Regardless of the specific mechanism controlling forwarding of messages to mobile device 100, the message 22, or possibly a translated or reformatted version thereof, is sent to wireless gateway 16. The wireless infrastructure 18 includes a series of connections to wireless network 20. These connections could be Integrated Services Digital Network (ISDN), Frame Relay or T1 connections using the TCP/IP protocol used throughout the Internet. As used herein, the term "wireless network" is intended to include three different types of networks, those being (1) data-centric wireless networks, (2) voice-centric wireless networks and (3) dual-mode networks that can support both voice and data communications over the same physical base stations. Combined dual-mode networks include, but are not limited to, (1) Code Division Multiple Access (CDMA) networks, (2) the Group Special Mobile or the Global System for Mobile Communications (GSM) and the General Packet Radio Service (GPRS) networks, and (3) future third-generation (3G) networks like Enhanced Datarates for Global Evolution (EDGE) and Universal Mobile Telecommunications Systems (UMTS). Some older examples of data-centric network include the Mobitex™ Radio Network and the DataTAC™ Radio Network. Examples of older voice-centric data networks include Personal Communication Systems (PCS) networks like GSM, and TDMA systems.

Figure 2:
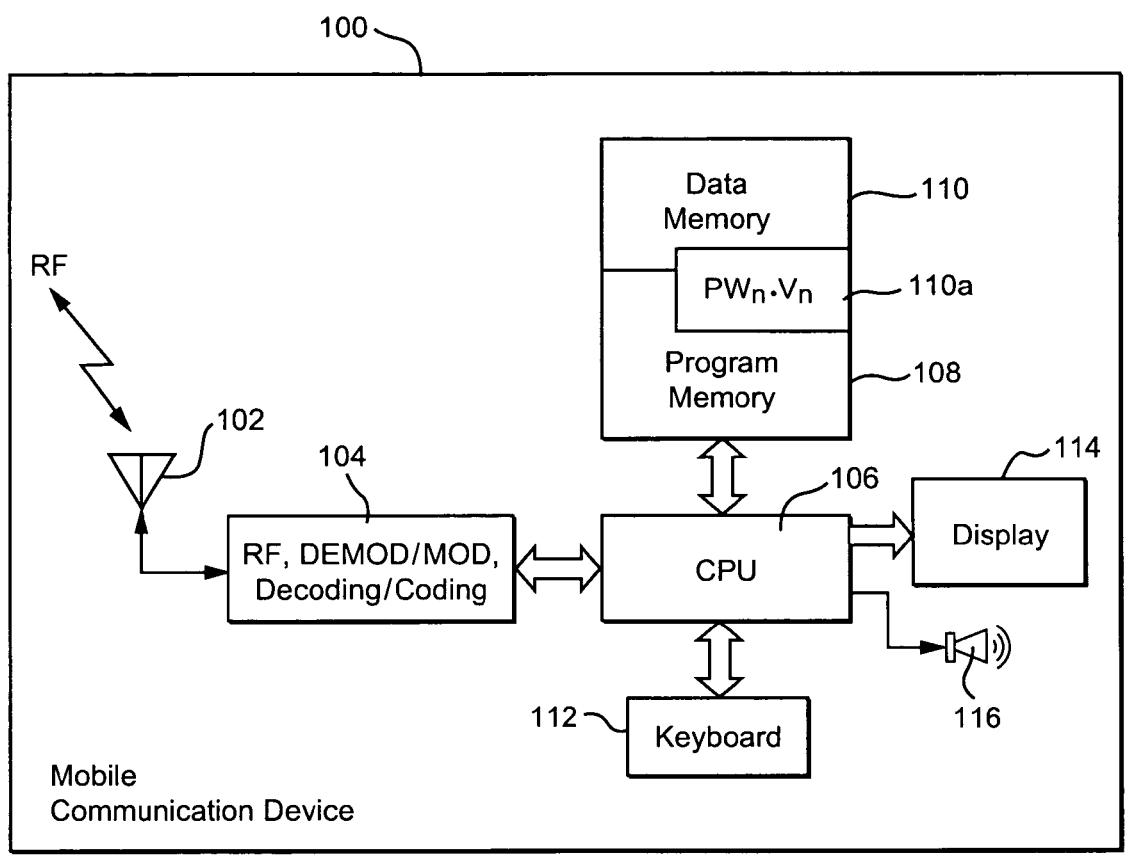
FIG. 2 is an abbreviated schematic diagram of hardware included within an exemplary mobile wireless communication device of FIG. 1.

As depicted in FIG. 2, mobile communication device 100 includes a suitable RF antenna 102 for wireless communication to/from wireless network 20. Conventional RF, demodulation/modulation and decoding/coding circuits 104 are provided. As those in the art will appreciate, such circuits can involve possibly many digital signal processors (DSPs), microprocessors, filters, analog and digital circuits and the like. However, since such circuitry is well known in the art, it is not further described.

The mobile communication device 100 will also typically include a main control CPU 106 which operates under control of a stored program in program memory 108 (and which has access to data memory 110). CPU 106 also communicates with a conventional keyboard 112, display 114 (e.g., an LCD) and audio transducer or speaker 116. A portion of program and/or data memory 110a is available for storing one or more passwords associated with unique version data (e.g., denoted $PW_n.V_n$ for the nth password PW stored in association with corresponding nth version data V). Suitable computer program executable code is stored in portions of program memory 108 to constitute the password-associated storage and checking logic described below.

Figure 3:
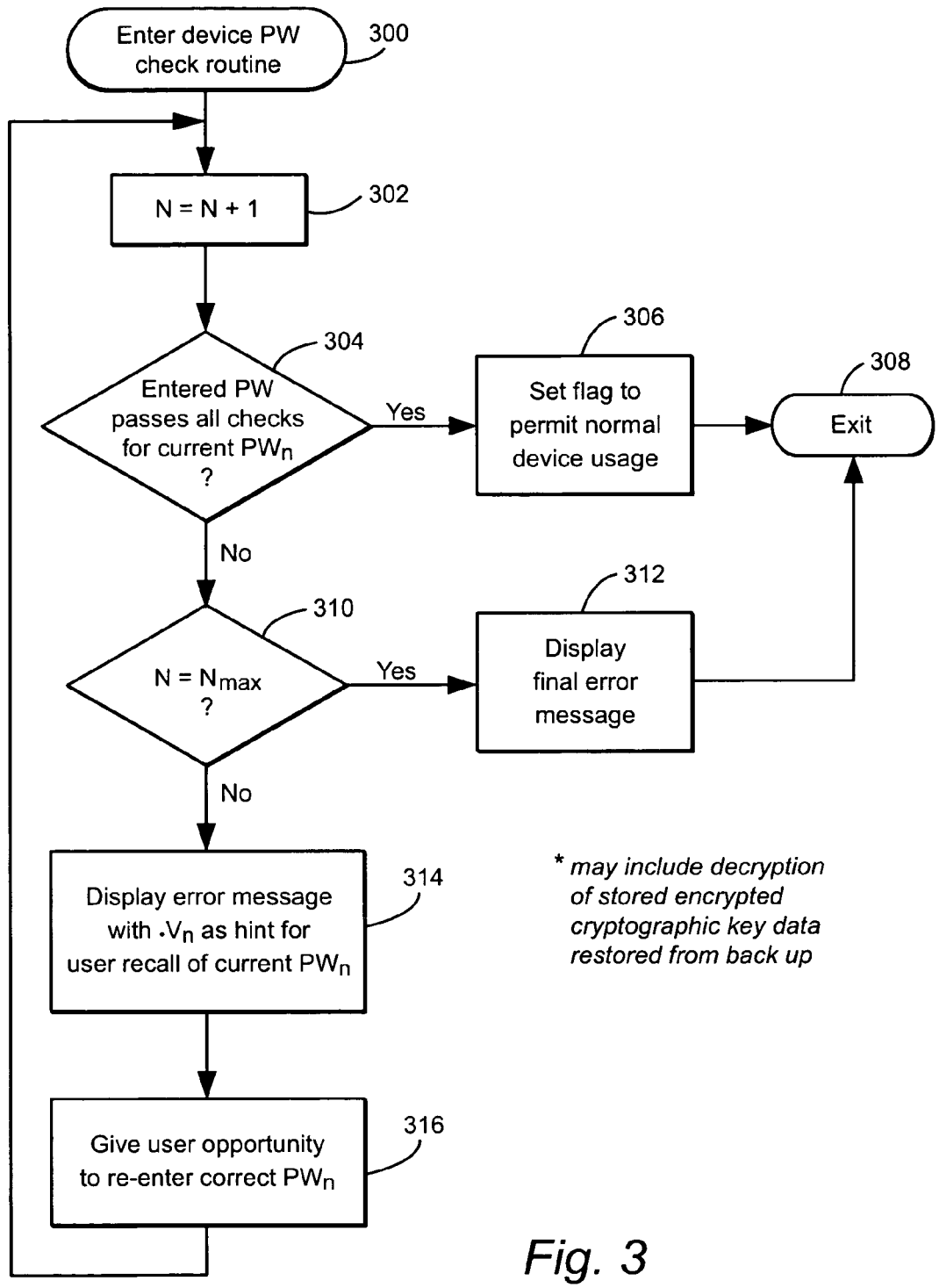
FIG. 3 is an exemplary abbreviated schematic flow chart of computer software (i.e., program logic) that may be utilized in the device of FIG. 2 for a password checking routine.

The program logic module in FIG. 3 for checking a device password is entered at 300. If multiple opportunities for password entry and checking are desired, then a suitable loop counter N may be incremented at 302. One or more password checks are effected at 304 to ascertain whether the entered password PW is actually the correct current password $PW_n$. As noted above, the entered password PW may actually be needed for decryption of stored encrypted cryptographic private key data that has been restored from some earlier backup—and thus possibly having been protected with a password that is different from what the user currently expects. Those in the art will understand that the password checking performed at 304 may include very sophisticated multiple checks of passwords (possibly including checking for a duress password as described in copending and commonly assigned application Ser. No. 10/835,260 filed Apr. 30, 2004 naming Michael S. Brown, Neil P. Adams, Herbert A. Kittle, Michael G. Kirkup, Michael K. Brown, Ian M. Robertson and Jonathan F. Hammell as inventors, the entire content of which is hereby incorporated by reference).

If the entered password is determined to be correct at 304, then a flag may be set at 306 to permit normal device usage before exiting the routine at 308. Of course, those in the art will understand many different techniques may be used to permit normal device usage once the password check has been successfully completed. For example, depending upon how the controlling software has been devised and configured, it may not be necessary to set any flag at all but, rather, to merely exit the routine with a jump to a normal operating routine.

However, if the entered password does not check out as being correct, then a loop counter check may be made at 310 (assuming that a loop counter is utilized). If the maximum number of attempts have already been reached, then a final error message may be displayed at 312 and an exit from the routine may be made 308 (albeit in such a manner as not to permit normal device usage).

Assuming that another attempt at password entry is permitted, then an error message is displayed at 314 using the associated version data $V_n$ as a hint for assisting in user recall of the current effective password $PW_n$ (which may actually be the password associated with earlier version data from a backup restoration). The user is then given another opportunity to re-enter the correct password at 316 before the routine loop is again executed as depicted in FIG. 3.

Figure 4:
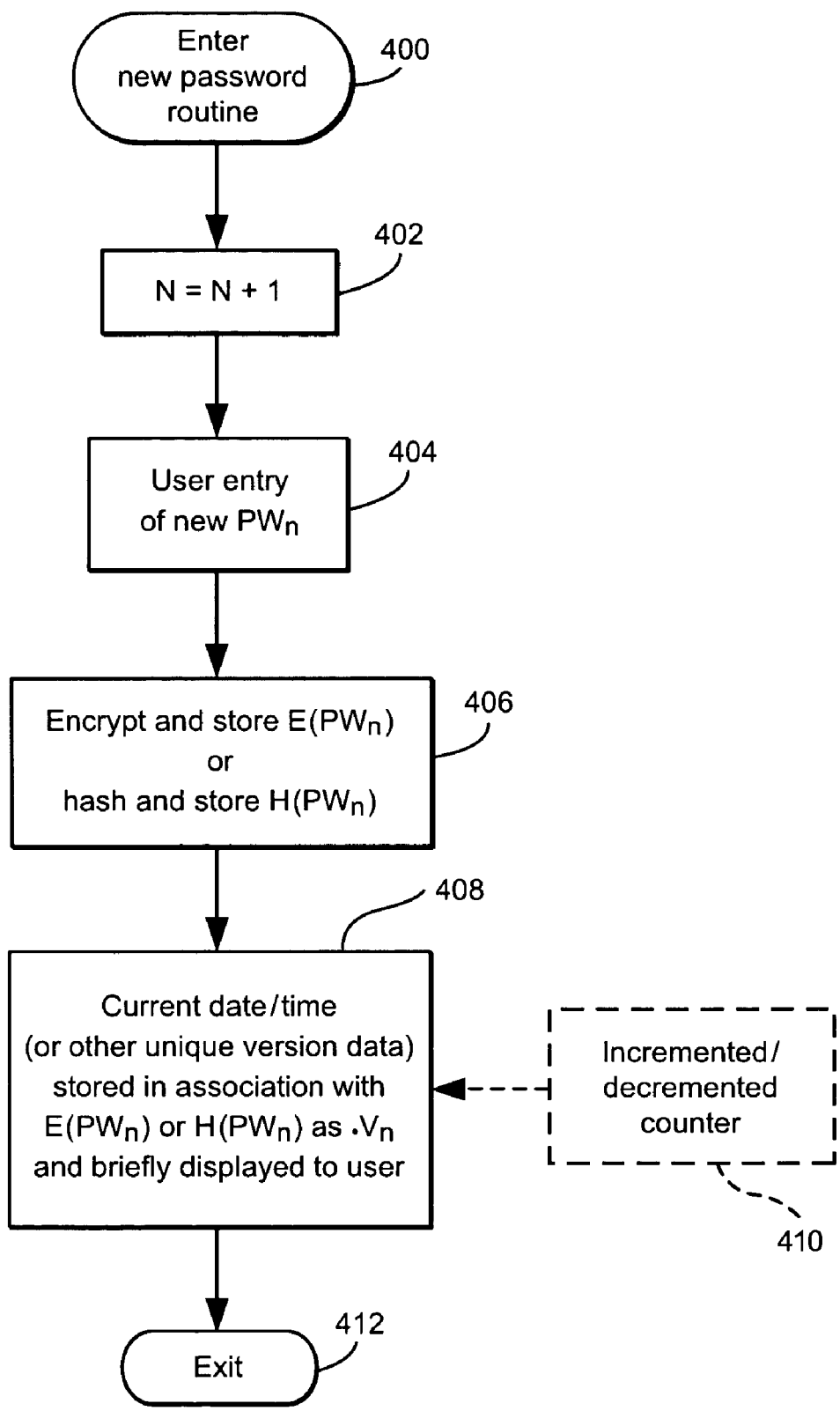
FIG. 4 is an exemplary abbreviated schematic flow chart of computer software (i.e., program logic) that may be utilized in the device of FIG. 2 to provide a routine for entry of new user-defined passwords.

The program logic of FIG. 4 may be entered at 400 so as to permit user entry of a new password. Here, if desired, a version number counter n may be incremented at 402 to, at least temporarily, be associated with the user's entry of a new password $PW_n$ at 404. As those in the art will appreciate, the usual and conventional techniques for permitting user entered digital data using a keyboard and visual display screen may typically be employed. If desired, the newly entered password data $PW_n$ may be encrypted at 406 and stored.

In one exemplary embodiment, unique versioning data is associated with the newly entered password data (possibly hashed or encrypted) at 408. In this exemplary embodiment, the current date/time (or other unique version data) is stored in association with the encrypted newly entered password data $E(PW_n)$ as Vn. If desired, this may be at least briefly displayed to the user (especially if time of day rather than merely date data is employed as part of the version data). Of course, the version counter n or some more permanent (and perhaps sophisticated) version counter (or random number generator) 410 may be incremented and/or decremented to provide a unique integer version number Vn for association with the newly entered user defined password $PW_n$ as depicted in dotted lines at 410. Once the new password has been properly defined and stored in association with unique version data, then the routine is exited at 412.

Figure 5:
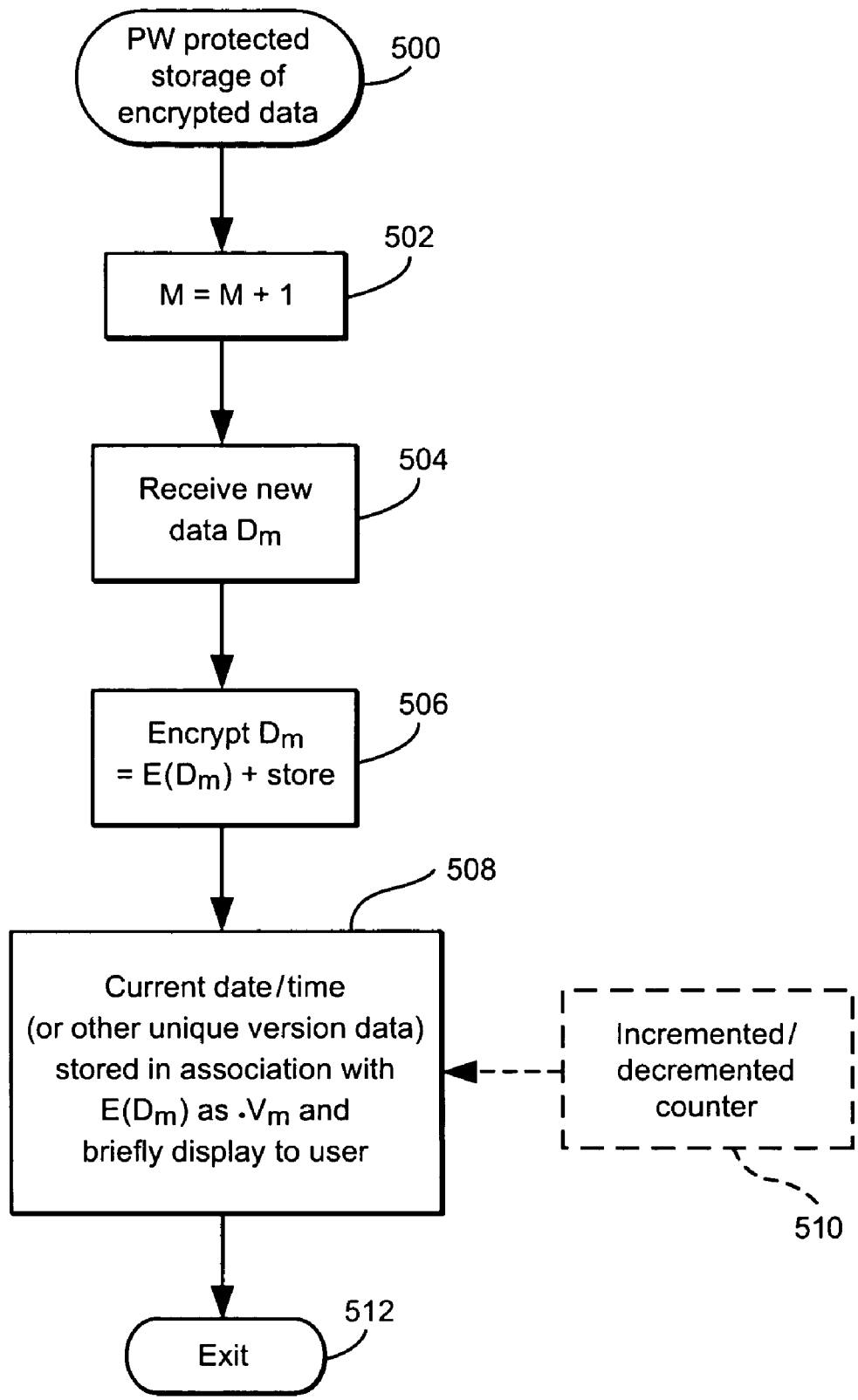
FIG. 5 is an exemplary abbreviated schematic flow chart of computer software (i.e., program logic) that may be utilized in the device of FIG. 2 to provide password protected storage of encrypted data.

The program logic of FIG. 5 is similar to that of FIG. 4 and may be entered at 500 for user storage of encrypted data of any desired type (e.g., possibly something other than a cryptographic key). The elements of the program logic routine in FIG. 5 that are analogous to those already shown and explained in respective FIG. 4 are denoted in FIG. 5 using the same two least significant digits for element numbers. Accordingly, it is believed that those skilled in the art will readily understand FIG. 5 and the context of the earlier description already given for FIG. 4.

Figure 6:
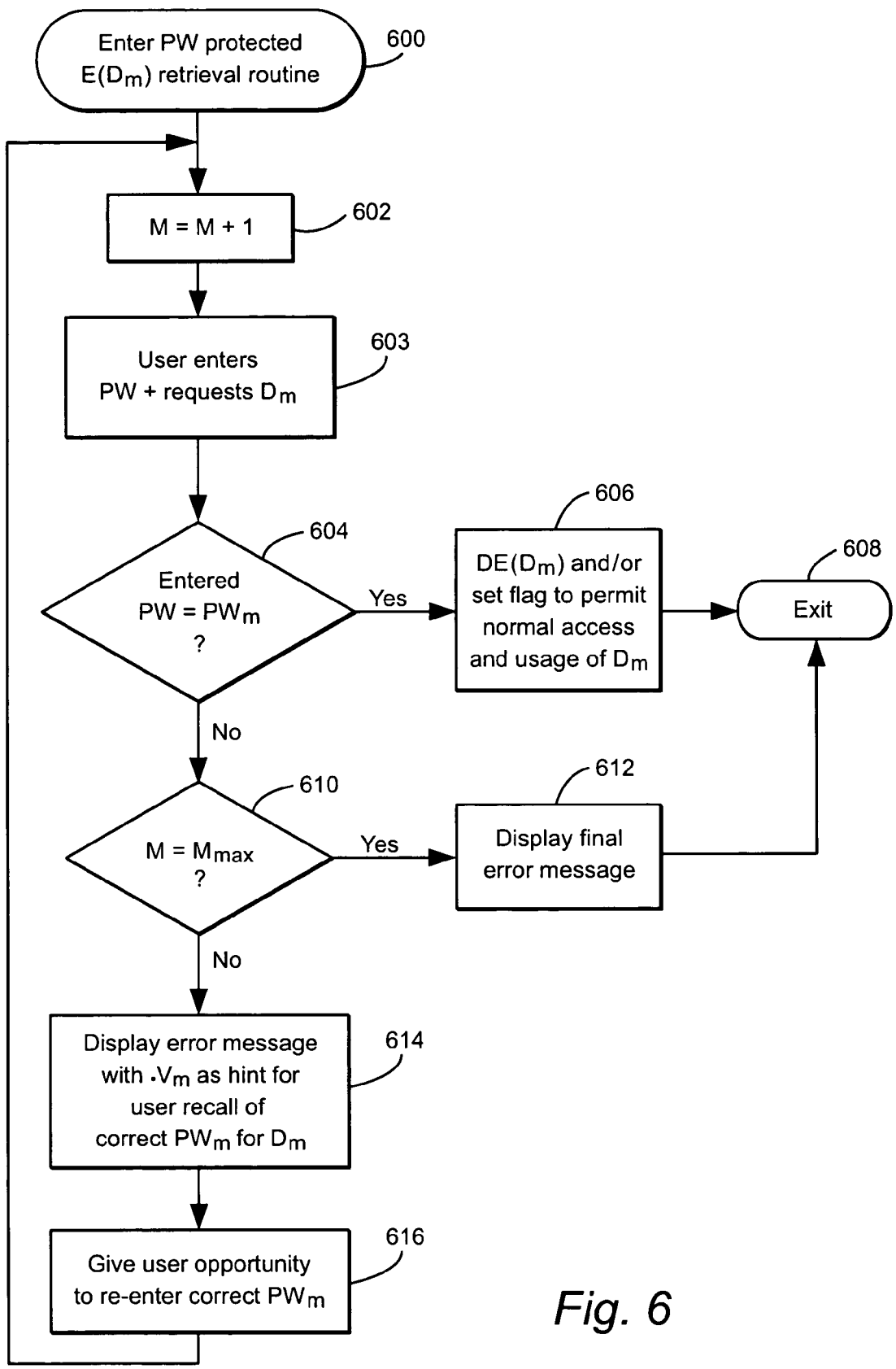
FIG. 6 is an exemplary abbreviated schematic flow chart of computer software (i.e., program logic) that may be utilized in the device of FIG. 2 to provide for user retrieval of password protected encrypted and stored data.

The program logic depicted in FIG. 6 permits the user to retrieve password protected encrypted data stored in accordance with FIG. 5. It is similar and analogous to the program logic already described in FIG. 3. The directly analogous segments of this program logic has been assigned reference numerals using the same two least significant digits and thus should be directly understood by those skilled in the art in reference to FIG. 3 and the earlier provided description thereof with respect to password checking. However, in FIG. 6, a separate element 603 has been more explicitly depicted for the user to enter a desired password PW and a request for some particular previously encrypted and stored data $D_m$. That is, while the program logic of FIG. 3 is more explicitly directed to checking for the current device password $PW_n$, the program logic of FIG. 6 may be utilized for retrieving any one of a number of previously encrypted and stored data sets $D_m$ which may have a corresponding number of different passwords $PW_m$ respectively associated therewith. Accordingly, the user may be required at 603 to identify a particular data set $D_m$ in addition to supplying a password PW that is believed to be the password $PW_m$ associated with that particular data set.

Figure 7:
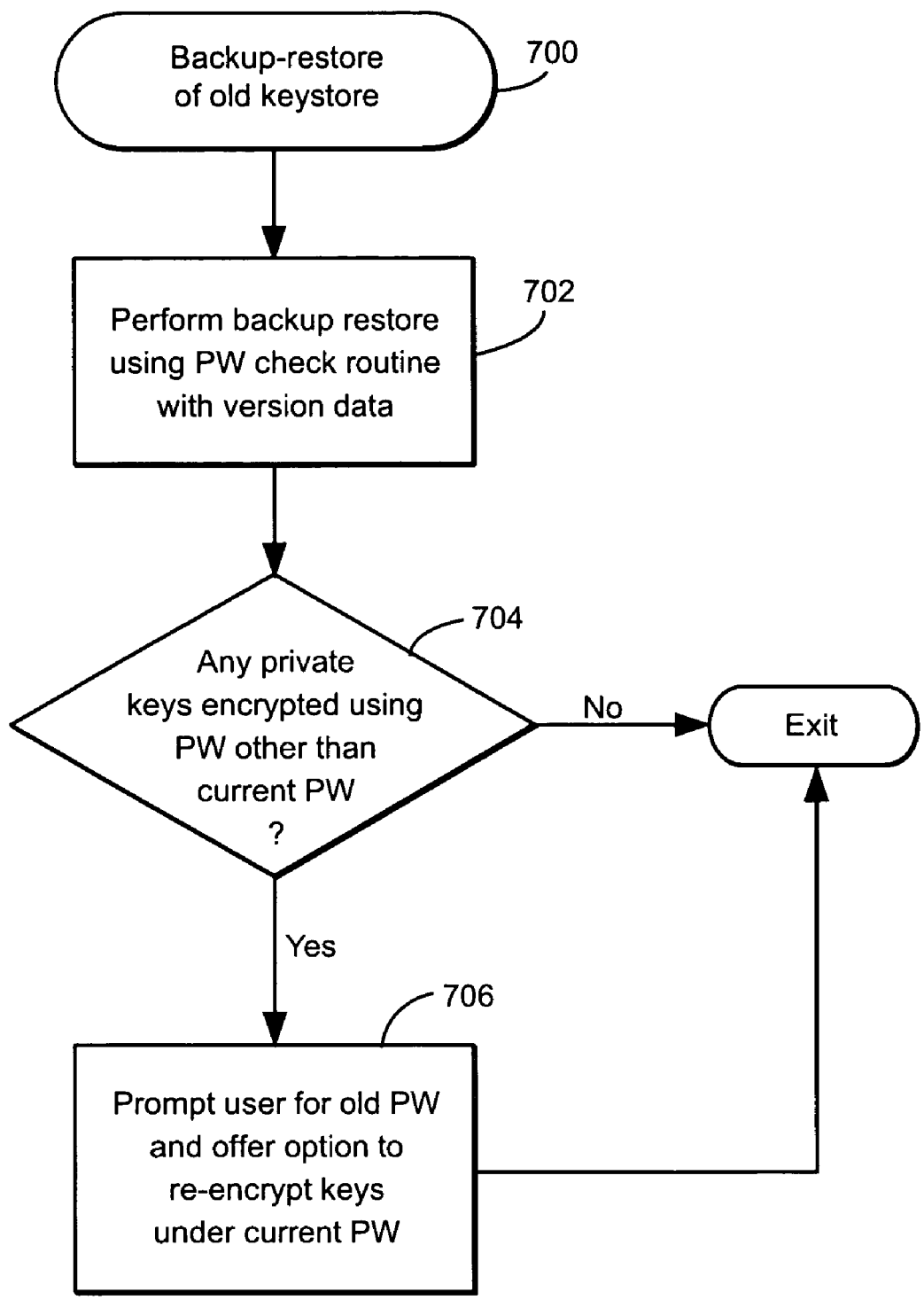
FIG. 7 is an exemplary abbreviated schematic flow chart of computer software (i.e., program logic) that may be utilized in the device of FIG. 2 to provide an easy option to re-encrypt backup-restored private keys under the latest current password.

As depicted in FIG. 7, after doing a backup-restore of an old keystore at 700, 702, it is preferable to check at 704 to see if there are any private keys encrypted using an old password. If any are found, the user is then prompted at 706 for the old password and to re-encrypt the keys under the new keystore password. The benefit to the user is that he/she does not need to remember the old password anymore.

A user's private keys may be encrypted with a Key Store password. The user also may have the ability to backup and restore those encrypted keys. It is possible, though, for the user to change the password. This can cause problems. If the user backs up the keys, changes his/her password, and then restores the old keys, how does the device know what password to ask for when trying to decrypt the restored keys?

This problem is solved by employing password version data. For example, an integer (or a user readable data string representation of version data such as date/time) may be stored in association with the encrypted copy of some data to identify which password was used to protect that data.

In order to make this user friendly, the time that the password was set can be used as the password version data. The benefit of this, versus just using an incremented counter content, is that it provides a cue to help jog the user's memory. So rather than asking:

"This key was protected with an older password. Please enter it to decrypt the key."

we can instead ask:

"This key was protected with a password from Jun. 1, 2004. Please enter it to decrypt the key."

Another benefit of this method is that it provides a cue to the user, without revealing any useful information about the password to an attacker. Providing a clue such as "Your password begins with 'm' and ends in 'wave'," while helpful to the user, aids the attacker as well.

While the invention has been described in connection with what is presently considered to be the most practical and preferred exemplary embodiments, it is to be understood that the invention is not limited to the disclosed embodiments, but, on the contrary, is intended to cover all variations, modifications and equivalent arrangements included within the spirit and scope of the appended claims.

What is claimed is:

1. A method for use in an electronic device including password-protected functionality using a password that can be changed by the user, said method comprising:
   storing a user-specified password;
   automatically generating unique version data associated with said user-specified password, wherein said version data includes a date on which the associated password was defined; and
   providing said unique version data as a password hint of said user-specified password.

2. The method of claim 1 wherein said version data for successively defined passwords has respective successively increasing or decreasing value.

3. The method of claim 2 wherein said version data corresponds to counter data that is incremented or decremented at least once for each newly defined password.

4. The method of claim 1 wherein said password-protected functionality decrypts stored cryptographic key data.

5. The method of claim 1 wherein said password-protected functionality decrypts cryptographic key data that has been restored from backed-up data.

6. The method of claim 1 wherein said version data comprises an integer value.

7. The method of claim 1 wherein said version data comprises a data string.

8. The method of claim 1 further comprising storing said version data in association with encrypted data and said version data includes data that corresponds to a password used during encryption of said encrypted data.

9. An electronic device including password-protected functionality using a password that can be changed by a user, said device comprising:
   means for storing a user-specified password in association with automatically generated unique version data, wherein said version data includes a date on which the associated password was defined; and means for subsequently providing said unique version data as a password hint of said user-specified password.

10. The device of 9 including means for causing said version data for successively defined passwords to have respective successively increasing or decreasing value.

11. The device of claim 10 including means for causing said version data to correspond to counter data that is incremented or decremented at least once for each newly defined password.

12. The device of claim 9 including means for causing said password-protected functionality to decrypt stored cryptographic key data.

13. The device of claim 9 including means for causing said password-protected functionality to decrypt cryptographic key data that has been restored from backed-up data.

14. The device of claim 9 including means for causing said version data to comprises an integer value.

15. The device of claim 9 wherein said version data comprises a data string.

16. The device of claim 9 including means for causing said version data to be stored in association with encrypted data and to include data that corresponds to a password used during encryption of said encrypted data.

17. A computer program storage medium carrying a computer program for an electronic device including password-protected functionality using a password that can be changed by a user, said program being capable, when executed, of effecting a method comprising:
    storing a user-specified password;
    automatically generating unique version data associated with said user-specified password, wherein said version data includes a date on which the associated password was defined; and
    providing said unique version data as a password hint of said user-specified password.

18. The computer program storage medium of claim 17 wherein said version data for successively defined passwords has respective successively increasing or decreasing value.

19. The computer program storage medium of claim 18 wherein said version data corresponds to counter data that is incremented or decremented at least once for each newly defined password.

20. The computer program storage medium of claim 17 wherein said password-protected functionality decrypts stored cryptographic key data.

21. The computer program storage medium of claim 17 wherein said password-protected functionality decrypts cryptographic key data that has been restored from backed-up data.

22. The computer program storage medium of claim 17 wherein said version data comprises an integer value.

23. The computer program storage medium of claim 17 wherein said version data comprises a data string.

24. The computer program storage medium of claim 17 wherein said program is further capable, when executed, of effecting a method comprising storing said version data in association with encrypted data and said version data includes data that corresponds to a password used during encryption of said encrypted data.

* * * * *